A. Whitmarsh.
Horse Hay Fork.
No. 53070 — Patented Mar. 6, 1866.
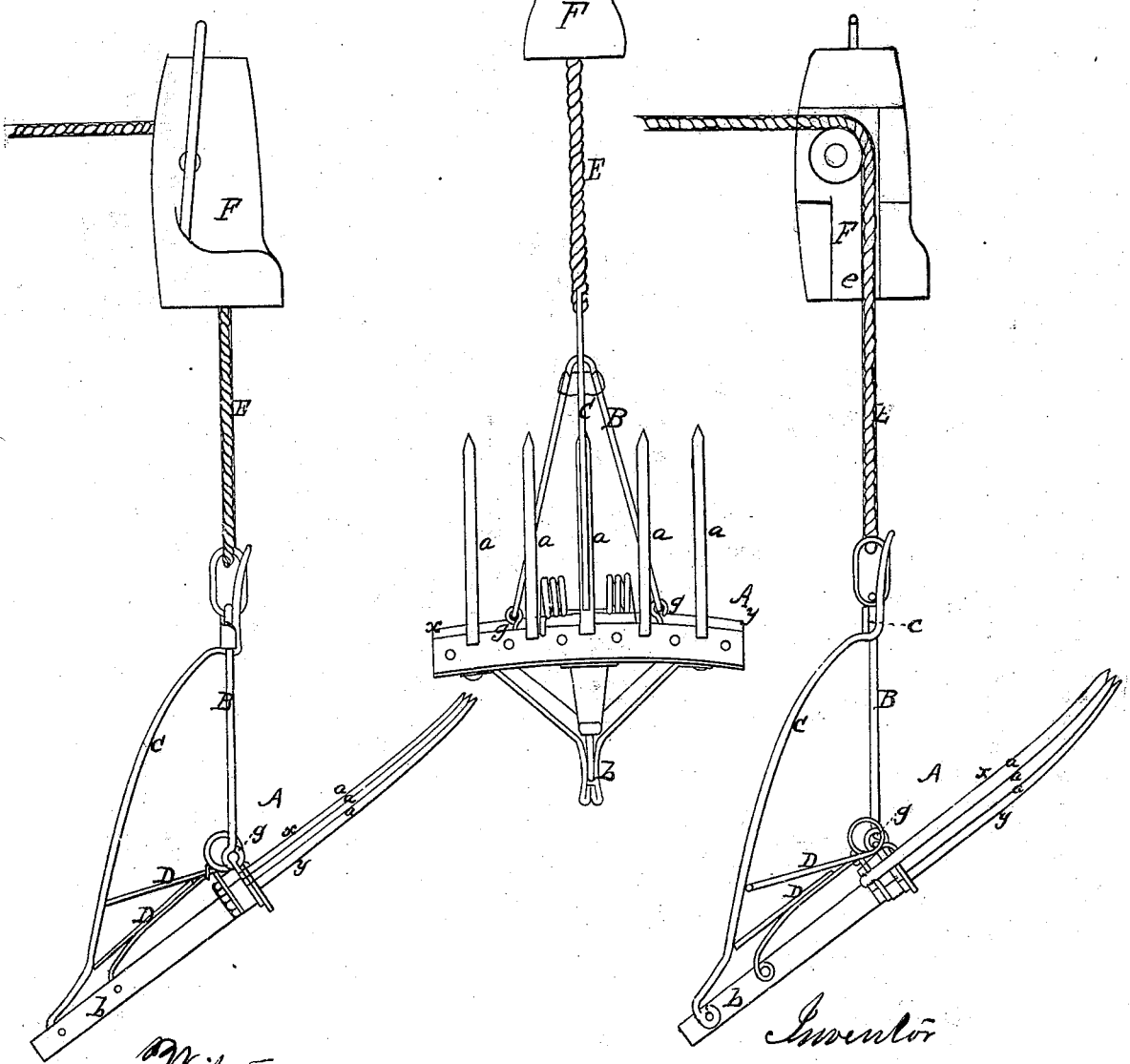

UNITED STATES PATENT OFFICE.

ASAPH WHITMARSH, OF EAST BRIDGEWATER, MASSACHUSETTS.

IMPROVEMENT IN HORSE HAY-FORKS.

Specification forming part of Letters Patent No. 53,070, dated March 6, 1866.

*To all whom it may concern:*

Be it known that I, ASAPH WHITMARSH, of East Bridgewater, of the county of Plymouth and State of Massachusetts, have invented a new and useful Improvement in Hay-Forks; and I do hereby declare the same to be fully described in the following specification and represented in the accompanying drawings, of which—

Figure 1 is a front view, Fig. 2 a side elevation, and Fig. 3 a vertical section, of a hay-fork and its block constructed in accordance with my invention.

The peculiar hay-fork to which my invention appertains is that which is generally hoisted by a tackle or line and block or pulley, and serves to transfer a large amount of hay from a cart to the mow of a barn. As heretofore made these forks have been so constructed as to be tripped by a line or tripping-rope in order to effect the discharge of the hay, thus rendering it necessary to have, in addition to the force required to raise the fork, a person to operate the tripping-line. The purpose of my invention is to dispense with the services of such person, and to accomplish this by so making the fork that the tripping of it may be performed automatically. I also arrange the series of prongs of the fork in a curve whose convexity is upward, the same being to enable a mass of hay while on the fork to bear equally, or about so, on the several prongs. When hay is taken up by the fork large portions of it project beyond the fork. This causes the hay to crown at its middle and exert a greater bearing on the outside prongs and those immediately adjacent to them than on the others. In consequence of this the prongs are liable to be broken or more or less bent out of their proper position—an accident not of unfrequent occurrence.

In the drawings, A represents the fork, the prongs of which are shown at *a a*, &c., those at the middle being higher than those at the sides of the fork, and the several prongs being disposed in a curve, *x y*, going transversely through it.

The fork is suspended by and so as to be capable of being turned within a swivel or yoke, B, and it has an arm, *b*, projecting back from it. From this arm a spring tripper or catch, *c*, projects toward and through the upper part of the bail B in manner as represented in the drawings, and such tripper is formed with a shoulder, *c*, to catch against the bail. Furthermore, one or more springs, D, may be employed between the arm *b* and the tripper to press the tripper upward.

A hoisting line or rope, E, is connected to the eye or upper part of the bail and runs through a block, F, the said block being formed as shown in the drawings—viz., with a recess, *e*, which will permit the eye of the bail to be drawn up into the block far enough to cause the block to act against and disengage the tripper from the bail while the latter is being drawn up into it. The tripper should be curved, so that it may be capable of moving through the bail, the center of the radius of the curve being in the axes of the journals *g g* of the fork. These journals rest in bearings made in the lower parts of the legs of the bail. On loading the fork with hay and elevating the whole by the line of the tackle the tripper will be drawn into contact with the block, which will disengage the shoulder *c* from the bail, so as to enable the weight of the hay to turn the fork within the bail in a manner to cause the hay to be discharged from the fork.

What I claim as my invention is—

1. A hay-fork provided with a self-acting tripper, C, having a recess, *c*, made to operate with the bail B, and the block F, substantially in manner and for the purposes described.

2. The above-described arrangement of the prongs of the fork in a curve, whereby those in the middle of the fork-head are higher than those at the ends of it, the same being as and for the purpose specified.

ASAPH WHITMARSH.

Witnesses:
R. H. EDDY,
F. P. HALE, Jr.